United States Patent
Matsuo et al.

(10) Patent No.: US 9,126,652 B2
(45) Date of Patent: Sep. 8, 2015

(54) STEERING DAMPER CONTROL APPARATUS, AND A SADDLE RIDING TYPE VEHICLE HAVING THE SAME

(71) Applicant: Yamaha Hatsudoki Kabushiki Kaisha, Iwata-shi, Shizuoka (JP)

(72) Inventors: Masashi Matsuo, Shizuoka (JP); Nobuo Hara, Shizuoka (JP); Tatsuya Nagata, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/399,032

(22) PCT Filed: May 8, 2013

(86) PCT No.: PCT/JP2013/002961
§ 371 (c)(1),
(2) Date: Nov. 5, 2014

(87) PCT Pub. No.: WO2013/168422
PCT Pub. Date: Nov. 14, 2013

(65) Prior Publication Data
US 2015/0081172 A1    Mar. 19, 2015

(30) Foreign Application Priority Data
May 9, 2012 (JP) ................................. 2012-107636

(51) Int. Cl.
*B62D 6/00* (2006.01)
*B62K 21/08* (2006.01)
*B62K 11/04* (2006.01)
*F16F 9/53* (2006.01)
*F16F 9/12* (2006.01)

(52) U.S. Cl.
CPC ................. *B62K 21/08* (2013.01); *B62K 11/04* (2013.01); *F16F 9/125* (2013.01); *F16F 9/53* (2013.01); *F16F 9/535* (2013.01)

(58) Field of Classification Search
None
See application file for complete search history.

(56) References Cited

U.S. PATENT DOCUMENTS
2012/0022746 A1    1/2012   Negoro et al.

FOREIGN PATENT DOCUMENTS
EP    2 130 754 A1    12/2009
JP    63-11492 A      1/1988
(Continued)

OTHER PUBLICATIONS
Official Communication issued in International Patent Application No. PCT/JP2013/002961, mailed on Aug. 13, 2013.
(Continued)

*Primary Examiner* — Thomas Tarcza
*Assistant Examiner* — Garrett Evans
(74) *Attorney, Agent, or Firm* — Keating & Bennett, LLP

(57) ABSTRACT

A steering damper control apparatus includes a steering damper configured to generate a damping force which acts on a steering device, a pressure sensor configured to detect a pressure of a front wheel suspension, a steering angle sensor configured to detect a steering angle of the steering device, and a damping force adjuster configured to adjust the damping force of the steering damper with one of a first command value which is a damping force command value according to a change rate of the pressure, and a second command value which is a damping force command value according to a steering angular speed, based on each detection result of the pressure sensor and steering angle sensor.

15 Claims, 11 Drawing Sheets

(56) References Cited

FOREIGN PATENT DOCUMENTS

| | | |
|---|---|---|
| JP | 2009-083578 A | 4/2009 |
| JP | 2009-292377 A | 12/2009 |
| JP | 2012-025181 A | 2/2012 |

OTHER PUBLICATIONS

Official Communication issued in corresponding European Patent Application No. 13787871.6, mailed on Apr. 9, 2015.

Fig.11
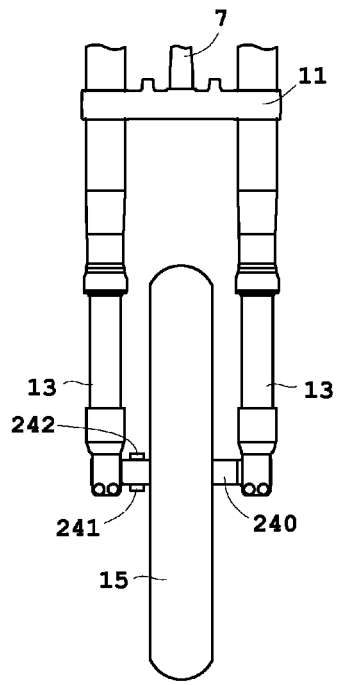
Fig. 11A
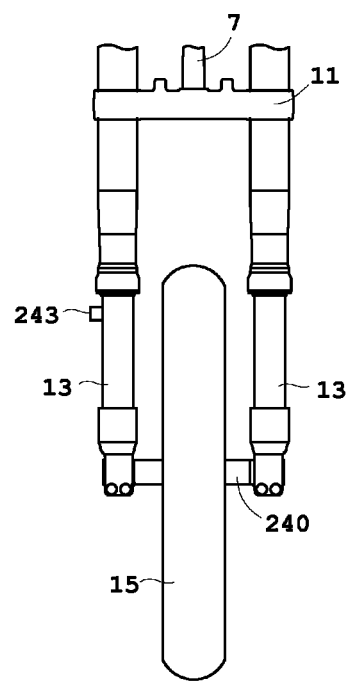
Fig. 11B
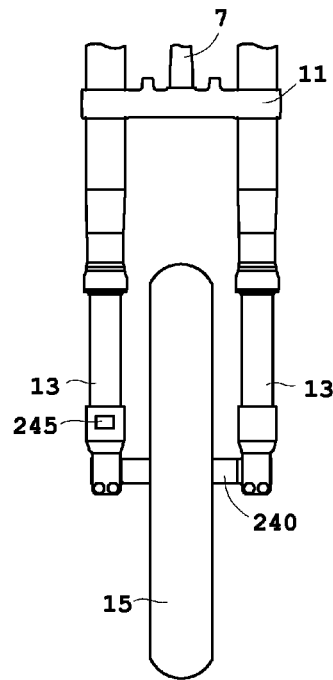
Fib. 11C
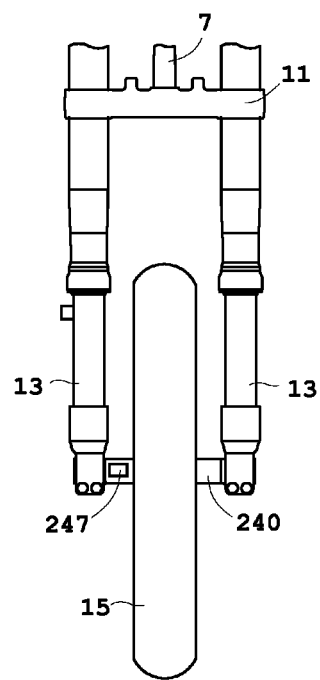
Fig. 11D

STEERING DAMPER CONTROL APPARATUS, AND A SADDLE RIDING TYPE VEHICLE HAVING THE SAME

BACKGROUND OF THE INVENTION

1. Field of the Invention

The present invention relates to a steering damper control apparatus configured to control a damping force of a steering device, and to a saddle riding type vehicle including the same.

2. Description of the Related Art

Steering damper control apparatuses are used on vehicles having various steering devices (e.g., steering gears), such as saddle riding type vehicles. The steering damper control apparatus adjusts the damping force of a steering device.

Unexamined Patent Publication No. 2012-25181 discloses a steering damper control apparatus mounted on a saddle riding type vehicle. The steering damper control apparatus disclosed in the above publication includes a damper, a steering angle sensor and a controller. The damper generates a damping force of a steering device (e.g., a handlebar). The steering angle sensor detects a steering angle. The controller controls the steering damper and adjusts the damping force based on a detection result of the steering angle sensor. Specifically, the controller causes a damping force to be generated until elapse of a predetermined time from when a steering angle speed exceeds a predetermined value. This inhibits a lowering of controllability of the steering device while inhibiting the steering device from being vibrated by a disturbance.

However, the conventional example with such construction has the following problems.

There is a wide range of disturbances that act on the steering device, and are different in magnitude, sharpness (steepness) and so on, of shocks. To cope with this, the steering damper control apparatus causes a damping force to be generated only when the steering angle speed of a steering shaft exceeds a predetermined value. Therefore, depending on modes of disturbance it can be difficult to inhibit vibration of the steering devices appropriately.

SUMMARY OF THE INVENTION

Preferred embodiments of the present invention provide a steering damper control apparatus that significantly reduces or prevents vibration of a steering device with increased effect, and a saddle riding type vehicle including the same.

According to a preferred embodiment of the present invention, a steering damper control apparatus includes a damper configured to generate a damping force which acts on a steering device; a load information detector configured to detect information relating to a load received by a front wheel; a steering angle detector configured to detect a steering angle of the steering device; and a damping force adjuster configured to adjust the damping force of the damper with one of a first command value which is a damping force command value according to a change rate of the load or a value corresponding to the change rate, and a second command value which is a damping force command value according to a steering angular speed, based on each detection result of the load information detector and the steering angle detector.

The change rate of a load on the front wheel, and the value corresponding to the change rate, are both indicators having relevance to vibration of the steering device due to a disturbance. For example, when the load acting on the front wheel increases, the steering device tends to be vibrated easily by a disturbance received by the front wheel. The steering angular speed is the change rate of the steering angle of the steering device, and directly indicates vibration of the steering device caused by a disturbance.

In the above construction, the damping force adjuster controls the damper by selectively using one of the first command value according to the change rate of the load on the front wheel or the value corresponding to the change rate (hereinafter called "the change rate of the load or the like" as appropriate), and the second command value according to the steering angular speed. That is, the damper preferably is configured to be controlled based on the detection result of the load information detector, and the damper preferably is configured to be controlled based also on the detection result of the steering angle detector. The former control generates a damping force when the load acting on the front wheel increases to render the steering device easily vibrated. This prevents vibration of the steering device. The latter control generates a damping force when the steering device actually vibrates, and thus, naturally, this effectively prevents vibration of the steering device.

This configuration suitably responds to various vibrations of the steering device due to a wide range of disturbances, and prevents vibration of the steering device with an increased effect.

The damping force is a resisting force against vibration (rotation) of the steering device. This damping force, besides a force acting to damp vibration (rotation) of the steering device when the steering device is vibrating (rotating), includes a force (resistance) acting to prevent the steering device from beginning to vibrate (rotate) when the steering device is not vibrating (rotating).

It is preferable that the damping force adjuster is arranged to select the larger of the first command value and the second command value.

The damping force adjuster compares the first and second command values, and selects the command value corresponding to a greater damping force. And the damper is controlled based on the selected one of the first and second command values. It is assumed that the larger the damping force command value becomes, the stronger becomes the damping force corresponding to the damping force command value.

It is preferable that the damping force adjuster includes plural types of load control information correlating the change rate of the load or the value corresponding to the change rate and the damping force command value, and plural types of steering angle control information correlating the steering angular speed and the damping force command value; and that the apparatus also includes an information designator configured to input a command that designates the load control information and the steering angle control information to which the damping force adjuster refers.

The damping force adjuster, which preferably includes the plural types of load control information and the plural types of steering angle control information, can use the load control information and steering angle control information selectively according to situations, thus to determine the first and second command values all the more appropriately. Specifically, the damping force adjuster determines the first command value by referring to one type of the load control information designated by the information designator, and determines the second command value by referring to one type of steering angle control information designated by the information designator. The information designator, by switching the load control information and steering angle control information, respectively, easily changes characteristics of the steering damper control apparatus. The "situations" may, for example, include traveling surface conditions (grip, ease of slipping, flatness, paved/unpaved, etc.), the weather, vehicle states (weight, speed) and so on.

It is preferable that each type of the load control information defines a pair with one type of the steering angle control information, and the information designator is arranged to designate one of the pairs.

Each type of the load control information is correlated with one type of the steering angle control information. Consequently, a plurality of pairs are provided, each including one type of load control information and one type of steering angle control information. By inputting a command designating one of the pairs to the information designator, one type of load control information and one type of steering angle control information preferably is designated en bloc.

It is preferable that, in any one of the pairs, a maximum damping force command value in the load control information is smaller than a minimum damping force command value in the steering angle control information.

In this pair, the first command value never becomes equal to or larger than the second command value. Therefore, by designating this pair, the damper preferably is substantially controlled only by the second command value which is the damping force command value corresponding to the steering angular speed.

It is preferable that, in any one of the pairs, a maximum damping force command value in the steering angle control information is smaller than a minimum damping force command value in the load control information.

In this pair, the second command value never becomes equal to or larger than the first command value. Therefore, by designating this pair, the damper preferably is substantially controlled only by the first command value which is the damping force command value corresponding to the change rate of the load or the like.

It is preferable that the damping force adjuster includes plural types of load control information correlating the change rate of the load or the value corresponding to the change rate and the damping force command value, and that the apparatus also includes an information designator configured to input a command to designate the load control information to which the damping force adjuster refers.

The damping force adjuster, since it includes the plural types of load control information, is capable of determining the first command value all the more appropriately. Specifically, the damping force adjuster determines the first command value by referring to one type of the load control information designated by the information designator. The information designator, by switching the load control information, easily changes characteristics of the steering damper control apparatus.

It is preferable that the damping force adjuster includes plural types of steering angle control information correlating the steering angular speed and the damping force command value, and that the apparatus also includes an information designator configured to input a command to designate the steering angle control information to which the damping force adjuster refers.

The damping force adjuster, since it includes the plural types of steering angle control information, is capable of determining the second command value according to situations all the more appropriately. Specifically, the damping force adjuster determines the second command value by referring to the steering angle control information designated by the information designator. The information designator, by switching the steering angle control information, easily changes characteristics of the steering damper control apparatus.

It is preferable that at least one type of the load control information includes at least one partial region of a range where the change rate of the load or the value corresponding to the change rate is positive, the at least one partial region being located where the damping force command value increases with the change rate of the load or the value corresponding to the change rate.

When a load acting substantially upward on the front wheel increases, the change rate of the load or the like takes a positive value. When the change rate of the load or the like is positive, the steering device tends to be vibrated easily, compared with a time when the change rate of the load or the like is negative. The steeper the increase of the road is, the greater becomes the change rate of the load or the like. When the change rate of the load or the like increases, the steering device tends to be vibrated easily by a strong force. According to the above load control information, a damping force is generated in at least a portion of the range where the change rate of the load or the like is positive. Consequently, when the steering device vibrates easily, the damping force is substantially be applied to the steering device. According to the above load control information, the damping force command value increases with the change rate of the load or the like in at least a portion of the range where the change rate of the load or the like is positive. Consequently, the larger the disturbance is which causes vibration of the steering device, the greater the damping force can be made. Therefore, even when the load changes steeply, vibration of the steering device is effectively prevented.

It is preferable that at least one type of the steering angle control information includes a region where the damping force command value increases with an absolute value of the steering angular speed.

The larger the absolute value of the steering angular speed is, the more the steering device tends to be vibrated by a strong force. According to the above steering angle control information, in at least one portion of a range of the absolute value of the steering angular speed, the damping force command value increases with the absolute value of the steering angular speed. Therefore, the larger the absolute value of the steering angular speed is, the greater the damping force acting on the steering device can be made. Consequently, even when the absolute value of the steering angular speed is large, vibration of the steering device is effectively prevented.

It is preferable that the apparatus includes a command value designator configured to receive at least one of a command to designate the first command value and a command to designate the second command value, wherein the damping force adjuster is configured, when the command is inputted to the command value designator, to select one of the first command value and the second command value, whichever is designated by the command value designator, regardless of a magnitude relation between the first command value and the second command value.

The command value designator allows the damping force adjuster to perform easily the process of selecting the first command value and second command value. Specifically, a change can be made to at least one of the control of the damper based only on the detection result of the load information detector, and the control of the damper based only on the detection result of the steering angle detector.

It is preferable that the damper includes a magnetic fluid, and an electromagnet configured to apply a magnetic field to the magnetic fluid in response to an electric current flowing therethrough which corresponds to one of the first command value and the second command value selected by the damping force adjuster.

When a magnetic field is applied to the magnetic fluid, the viscosity of the magnetic fluid will change and a damping force will substantially be generated. Consequently, even when the steering device is actually not moving (even when it is not vibrating), the damper can apply the damping force to the steering device.

It is preferable that the damper is arranged to generate the damping force by a shearing force of the magnetic fluid, and the electromagnet is arranged to vary the shearing force of the magnetic fluid.

The damper, since it is preferably a "shear type" damper, is configured to significantly reduce or minimize the damping force when the damping force command value is at a minimum. Consequently, when the damping force is at a minimum, a lowering of the controllability of the steering device is prevented with increased effect.

It is preferable that the load information detector is a pressure detector configured to detect a pressure of a front wheel suspension, and the damping force adjuster is configured to determine the first command value according to a change rate of the pressure of the suspension.

The pressure of the suspension corresponds to the load received by the front wheel. The change rate of the pressure of the suspension is a value corresponding to the change rate of the load on the front wheel. With the pressure detector, therefore, the load information detector is realized conveniently.

According to another preferred embodiment of the present invention, a saddle riding type vehicle includes a steering damper control apparatus, and the steering damper control apparatus includes a damper configured to generate a damping force which acts on a steering device; a load information detector configured to detect information relating to a load received by a front wheel; a steering angle detector configured to detect a steering angle of the steering device; and a damping force adjuster configured to control the damper with one of a first command value which is a damping force command value according to a change rate of the load or a value corresponding to the change rate, and a second command value which is a damping force command value according to a steering angular speed, based on each of the detection results of the load information detector and the steering angle detector.

The damper preferably is configured to be controlled based on the detection result of the load information detector, and the damper preferably is configured to be controlled based also on the detection result of the steering angle detector. This configuration suitably responds to various vibrations of the steering device due to a wide range of disturbances. Therefore, the burden of the rider who operates the steering device is further lightened.

The steering damper control apparatus and the saddle riding type vehicle including such a steering damper control apparatus according to various preferred embodiments of the present invention are configured to suitably respond to various vibrations of the steering device due to a wide range of disturbances. Therefore, the burden of the rider riding the saddle riding type vehicle is further lightened.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 2A and 2B are partly enlarged views showing an attached state of a steering damper according to Preferred Embodiment 1, in which FIG. 2A shows a plan view, and FIG. 2B shows a left side view.

FIG. 11A to FIG. 11D are views showing modified preferred embodiments of a sensor configured to detect information relating to loads acting on a front wheel.

DETAILED DESCRIPTION OF THE PREFERRED EMBODIMENTS

Preferred Embodiment 1

One preferred embodiment of the present invention will be described hereinafter with reference to the drawings. In the following description, a two-wheeled motor vehicle will be described as a non-limiting example of "saddle riding type vehicle".

Figure 1:
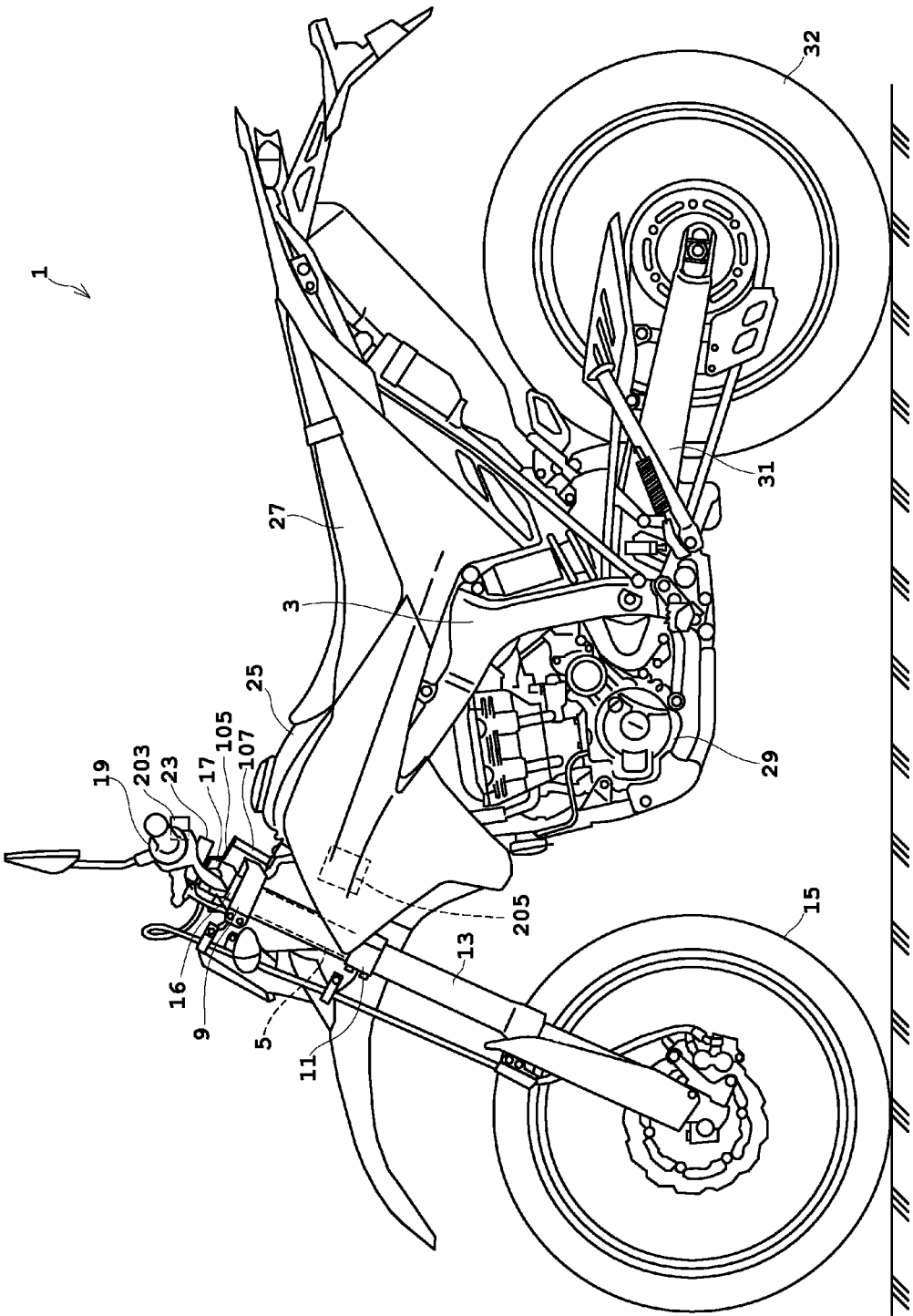
FIG. 1 is a left side view showing an entire two-wheeled motor vehicle according to Preferred Embodiment 1 of the present invention.
Figure 2A:
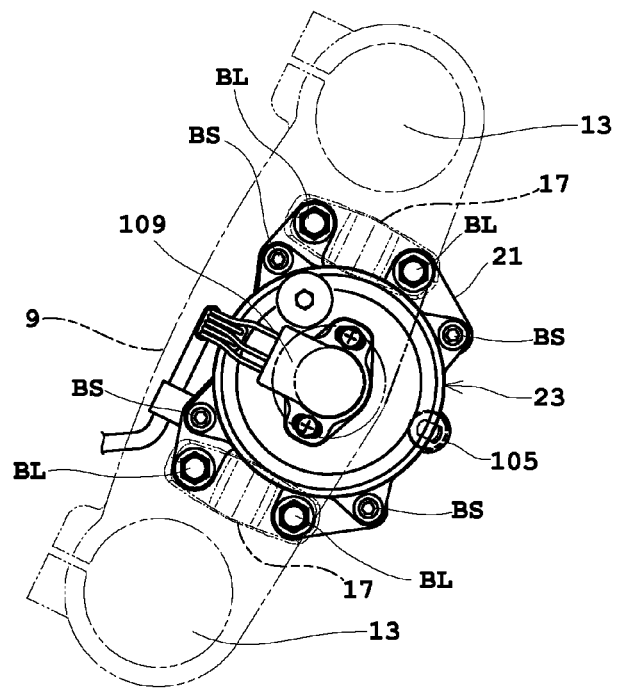
Figure 2B:
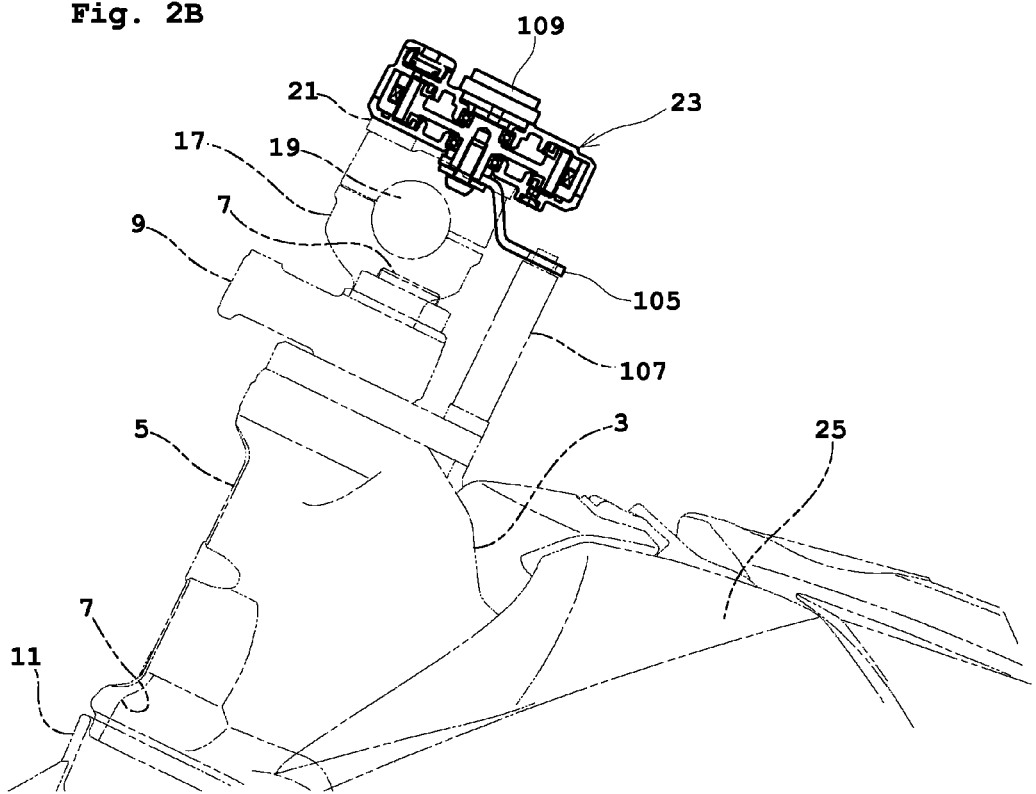

FIG. 1 is a left side view showing an entire two-wheeled motor vehicle according to Preferred Embodiment 1. FIGS. 2A and 2B are partly enlarged views showing an attached state of a steering damper according to Preferred Embodiment 1, in which FIG. 2A is a plan view, and FIG. 2B is a left side view.

A two-wheeled motor vehicle 1 includes a main frame 3. The main frame 3 defines a framework of the two-wheeled motor vehicle 1. Ahead tube 5 is disposed at a front end of the main frame 3. This head tube 5 is arranged in a tilted position appropriate to a caster angle. The head tube 5 preferably is formed hollow, and a steering shaft 7 is rotatably inserted in the hollow portion. The steering shaft 7 is fixed at a top end thereof to an upper bracket 9, and is fixed at a bottom end thereof to an under bracket 11. A pair of front forks 13 are attached to opposite ends in the transverse direction of the upper bracket 9 and under bracket 11. A front wheel 15 is rotatably supported by bottom ends of the pair of front forks 13.

A pressure sensor 16 is provided on one of the front forks 13 to detect a pressure of the front fork 13. The pressure sensor 16 detects an air pressure of an air chamber (not shown) provided in an upper portion of the front fork 13. The air chamber is located above an oil level of oil in the front fork 13. In the case where an air adjustment bore is provided in the front fork 13 to adjust the air pressure or to attach an air valve, the pressure sensor 16 may be connected directly or indirectly to this air adjustment bore. Consequently, the pressure sensor 16 is configured to be attached easily. The front forks 13 correspond to a suspension. The pressure sensor 16 corresponds to a pressure detector.

The upper bracket 9 includes a pair of handle holders 17 arranged on an upper surface thereof. Each of the handle holders 17 holds a steering handle 19 preferably through two bolts BL, for example. The steering handle 19 is operated by the driver. When the driver operates the steering handle 19, a steering force is transmitted through the steering shaft 7 to the pair of front forks 13 to steer the front wheel 15.

A mounting base 21 is co-fastened and fixed to an upper portion of the handle holders 17 preferably by the two bolts BL noted above, for example. In this case, a steering damper 23 described in detail hereinafter is attached beforehand to the mounting base 21 preferably by four bolts BS, for example. This steering damper 23 has a function to adjust a damping force when the driver operates the steering handle 19.

A fuel tank 25 is disposed on an upper portion of the main frame 3. A seat 27 is disposed on a portion of the main frame 3 rearward of the fuel tank 25. An engine 29 is disposed in a portion of the main frame 3 below the fuel tank 25. A rear arm 31 is swingably attached to the rear of the engine 29. The rear arm 31 rotatably holds a rear wheel 32 at the rear end thereof. Drive of the engine 29 is transmitted to the rear wheel 32 to propel the two-wheeled motor vehicle 1.

Figure 3:
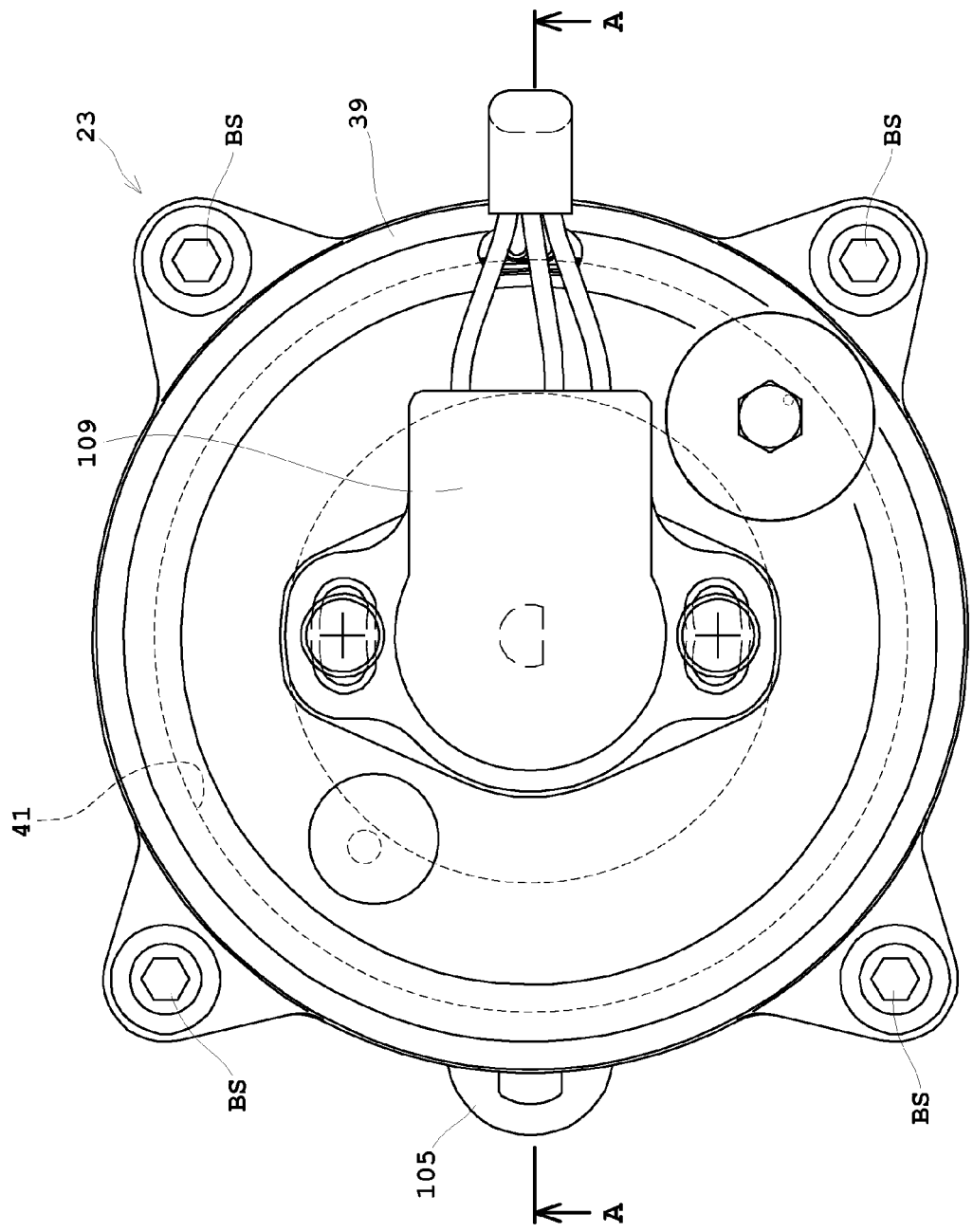
FIG. 3 is a plan view showing an outward appearance of the steering damper.
Figure 4:
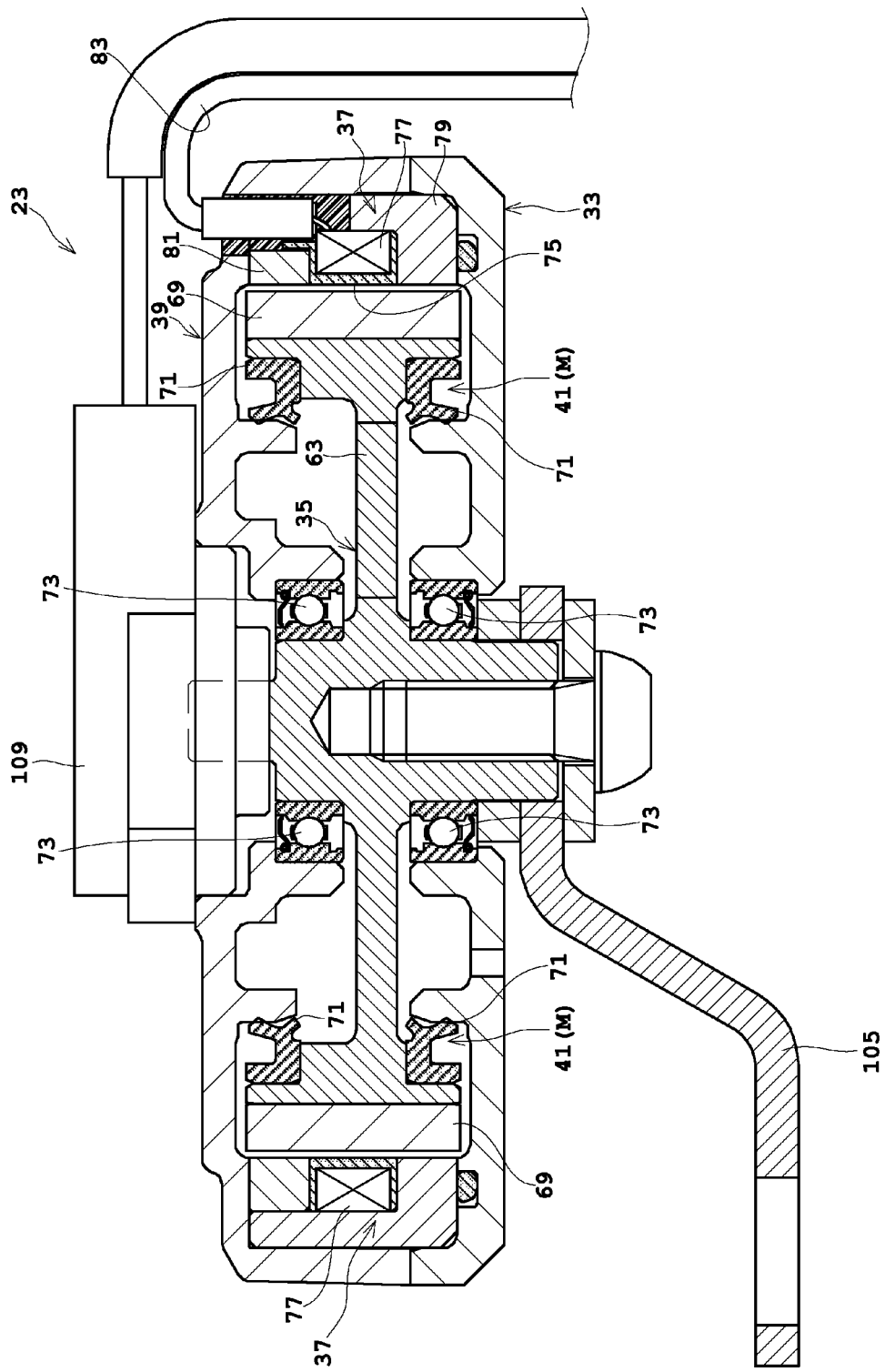
FIG. 4 is a section taking along line A-A of FIG. 3.

Next, the above steering damper 23 will be described in detail with reference to FIGS. 3 and 4. FIG. 3 is a plan view showing an outward appearance of the steering damper. FIG. 4 is a section taken along line A-A of FIG. 3.

As shown in FIGS. 3 and 4, the steering damper 23 mainly includes a lower casing 33, a rotor 35, an electromagnet 37, an upper casing 39 and a magnetic fluid chamber 41.

The lower casing 33 and upper casing 39 are fixed to each other. The lower casing 33 and upper casing 39 are fixedly supported by the mounting base 21 preferably through four bolts BS, for example. The lower casing 33 and upper casing 39 rotate integrally with the steering shaft 7 and steering handle 19. In this specification, the steering shaft 7 and steering handle 19 are collectively referred to as a "steering device", for example, but a steering device is not limited thereto.

The rotor 35 includes a disk portion 63 which preferably is disk-shaped or substantially disk-shaped, and an annular member 69 attached to an outer circumference of the disk portion 63. The rotor 35 is disposed between the lower casing 33 and upper casing 39. The rotor 35 (disk portion 63) is supported by the lower casing 33 and upper casing 39 through oil seals 71 and bearings 73. The rotor 35 is rotatable relative to the lower casing 33 and upper casing 39. Peripheral portions (including the annular member 69) of the rotor 35 are hermetically sealed by the oil seals 71. The annular member 69 is preferably made of a magnetic material such as metal, e.g. iron, nickel or manganese, or an alloy including iron such as zinc ferrite, nickel or manganese, for example.

One end of a stay arm 105 is attached to the rotor 35. The other end of the stay arm 105 is fixed to the main frame 3 through a stopper 107. That is, the rotor 35 is fixedly connected to the main frame 3. When the steering handle 19 rotates relative to the main frame 3, the lower casing 33 and upper casing 39 will rotate relative to the rotor 35.

A steering angle sensor 109 is attached to the rotor 35. The steering angle sensor 109 is configured to detect a rotation angle of the rotor 35 relative to the lower casing 33 and upper casing 39. A detection result of the steering angle sensor 109 corresponds to a steering angle of the steering device. The steering angle sensor 109 corresponds to a steering angle detector.

The electromagnet 37 is disposed between the lower casing 33 and upper casing 39. The electromagnet 37 has an inside diameter slightly larger than an outside diameter of the rotor 35, and is disposed to surround an outer circumferential surface of the rotor 35. The electromagnet 37 is fixed to the lower casing 33 and upper casing 39. The electromagnet 37 includes a bobbin 75, a coil 77, a yoke case 79 and a yoke cap 81. The coil 77 is wound on the bobbin 75 and is pinched by the yoke case 79 and yoke cap 81. Coil wiring 83 is connected to the coil 77.

The magnetic fluid chamber 41 is defined by the lower casing 33, rotor 35, electromagnet 37, upper casing 39 and oil seals 71. The magnetic fluid chamber 41 is filled with a magnetic fluid M.

The magnetic fluid M may, for example, be an MR fluid (Magneto-rheological fluid), an MCF fluid (Magnetic compound fluid) or an ER fluid (Electro-rheological fluid). All of these fluids have viscosities that are adjustable by applying a magnetic field or an electric field.

The MR fluid preferably includes a slurry with ferromagnetic fine particles dispersed in a liquid. The particle size of ferromagnetic fine particles is usually about tens of nm or less, for example. The ferromagnetic fine particles can be formed of metal such as iron, nickel or manganese, or an alloy including iron such as manganese zinc ferrite, nickel or manganese, for example. The liquid used to disperse the ferromagnetic material may be water or an aqueous solution, or may be an organic solvent such as isoparaffin, alkyl naphthalene or perfluoropolyether, for example.

In a state where a magnetic field is not applied, the ferromagnetic fine particles in the magnetic fluid M are in a state of being dispersed almost uniformly. Generally, therefore, the magnetic fluid M with no magnetic field applied thereto exhibits the behavior of a Newtonian fluid. On the other hand, when a magnetic field is applied, each magnetic domain in the magnetic fluid M will polarize magnetically. Therefore, for example, in the MR fluid, associative strength occurs among the ferromagnetic fine particles. Since a plurality of ferromagnetic fine particles form clusters, apparent viscosity will increase and shear force will increase.

When an electric current is passed through the electromagnet 37 (coil 77) to apply a magnetic field to the magnetic fluid M, the magnetic field will be applied mainly to the magnetic fluid M between the outer circumferential surface of the rotor 35 and the inner circumferential surface of the electromagnet 37. The shear force of the magnetic fluid M prevents a relative rotation between the lower casing 33/upper casing 39 and the rotor 35, and acts as a damping force for damping the rotation. With an increase of the damping force, the steering device becomes progressively difficult to move. With a decrease of the damping force, the steering device becomes progressively easy to move. The magnitude of the damping force is adjusted with the electric current supplied to the electromagnet 37.

In this specification, the "damping force" preferably includes both a force acting to damp vibration (rotation) of the steering device when the steering device is vibrating (rotating), and a force (resistance) acting to prevent the steering device from starting to vibrate (rotate) when the steering device is not vibrating (rotating), for example.

The steering damper 23 corresponds to a damper.

Figure 5:
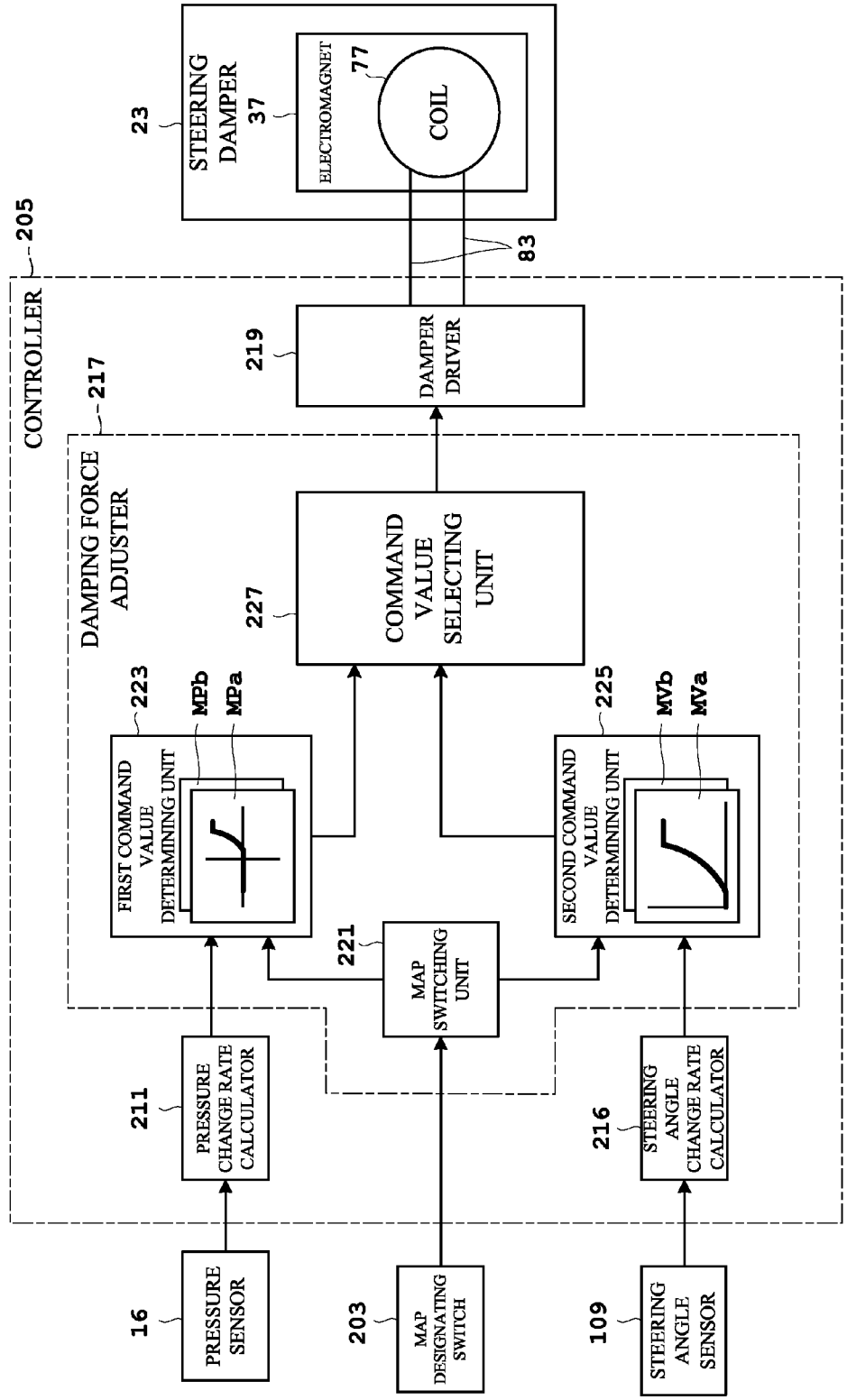
FIG. 5 is a block diagram showing an outline of a steering damper control apparatus in Preferred Embodiment 1 of the present invention.

FIG. 5 is a block diagram showing an outline of a steering damper control apparatus in Preferred Embodiment 1. A steering damper control apparatus 201 is configured and/or programmed to adjust the damping force acting on the steering device, based on a change rate of pressure of the front forks 13 (hereinafter called "pressure change rate" as appropriate) and a steering angular speed of the steering device. The steering damper control apparatus 201 includes a map designating switch 203 and a controller 205, besides the pressure sensor 16, steering damper 23 and steering angle sensor 109 described hereinbefore.

The map designating switch 203 receives a command to designate one pressure control map and one steering angle control map (to be described hereinafter). The command inputted to the map designating switch 203 is outputted to the controller 205. The map designating switch 203 is attached to the steering handle 19 (see FIG. 1). The rider is capable of operating the map designating switch 203. The map designating switch 203 corresponds to an information designator.

The controller 205 is configured and/or programmed to control the steering damper 23 based on detection results of the pressure sensor 16 and steering angle sensor 109 and the command from the map designating switch 203. The controller 205 is electrically connected to the pressure sensor 16, steering angle sensor 109, map designating switch 203 and steering damper 23.

The controller 205 is configured and/or programmed to include a pressure change rate calculator 211, a steering angular speed calculator 216, a damping force adjuster 217 and a damper driver 219.

The pressure change rate calculator 211 calculates a pressure change rate based on the detection result of the pressure sensor 16. The pressure change rate is outputted to the damping force adjuster 217.

The pressure change rate calculator 211, preferably, is defined by an analog circuit. The analog circuit may, for example, be a differentiating circuit constructed of an operational amplifier, a capacitor and a resistor, for example. The pressure change rate calculator 211 constructed in this way can calculate pressure change rates continually in time. Therefore, a temporal transition of the pressure change rate is obtained with high accuracy.

The steering angular speed calculator 216 calculates a steering angular speed which is a change rate of the steering angle based on detection results of the steering angle sensor 109. The steering angular speed is outputted to the damping force adjuster 217. It is preferred that the steering angular speed calculator 216 is also defined by an analog circuit, for example.

The damping force adjuster 217 adjusts the damping force of the steering damper 23 based on either a first command value which is a damping force command value corresponding to the pressure change rate, or a second command value which is a damping force command value corresponding to the steering angular speed.

The damping force adjuster 217 includes a map switching unit 221, a first command value determining unit 223, a second command value determining unit 225 and a command value selecting unit 227. The first command value determining unit 223 includes plural types of pressure control maps MP stored beforehand therein. The second command value determining unit 225 includes plural types of steering angle control maps MV stored beforehand therein. FIG. 5 schematically shows that the first command value determining unit 223 includes two pressure control maps MP (MPa, MPb), and the second command value determining unit 225 includes two steering angle control maps MV (MVa, MVb). The pressure control maps MP correspond to load control information. The steering angle control maps MV correspond to steering angle control information.

The map switching unit 221 selects one designated pressure control map MP based on the command of the map designating switch 203. In this preferred embodiment, the map switching unit 221 switches to one of the pressure control maps MPa and MPb. Similarly, the map switching unit 221 selects one designated steering angle control map MV. In this preferred embodiment, the map switching unit 221 switches to one of the steering angle control maps MVa and MVb.

The first command value determining unit 223 refers to the one pressure control map MP selected by the map switching unit 221, and determines a damping force command value corresponding to the pressure change rate, i.e. the first command value. The pressure control maps MP preferably are information in tabular form which correlates the pressure change rate and the damping force command value, for example. The damping force command value is information which specifies a magnitude of the damping force. The magnitude relation of the damping force command value is the same as the magnitude relation of the damping force. That is, the greater the damping force command value is, the greater becomes the damping force correlated with the damping force command value.

The second command value determining unit 225 refers to the steering angle control map MV designated by the map switching unit 221, and determines a damping force command value corresponding to the steering angular speed, i.e. the second command value. The steering angle control maps MV preferably are information in tabular form which correlates the steering angular speed and the damping force command value.

The command value selecting unit 227 selects the larger of the first command value and the second command value.

The damper driver 219 passes through the electromagnet 37 (more particularly, the coil 77) an electric current corresponding to the command value selected by the command value selecting unit 227.

The controller 205 described above may be an ECU of the two-wheeled motor vehicle 1, for example. Alternatively, the controller 205 may be provided exclusively for the steering damper control apparatus 201, separately from the ECU.

Figure 6:
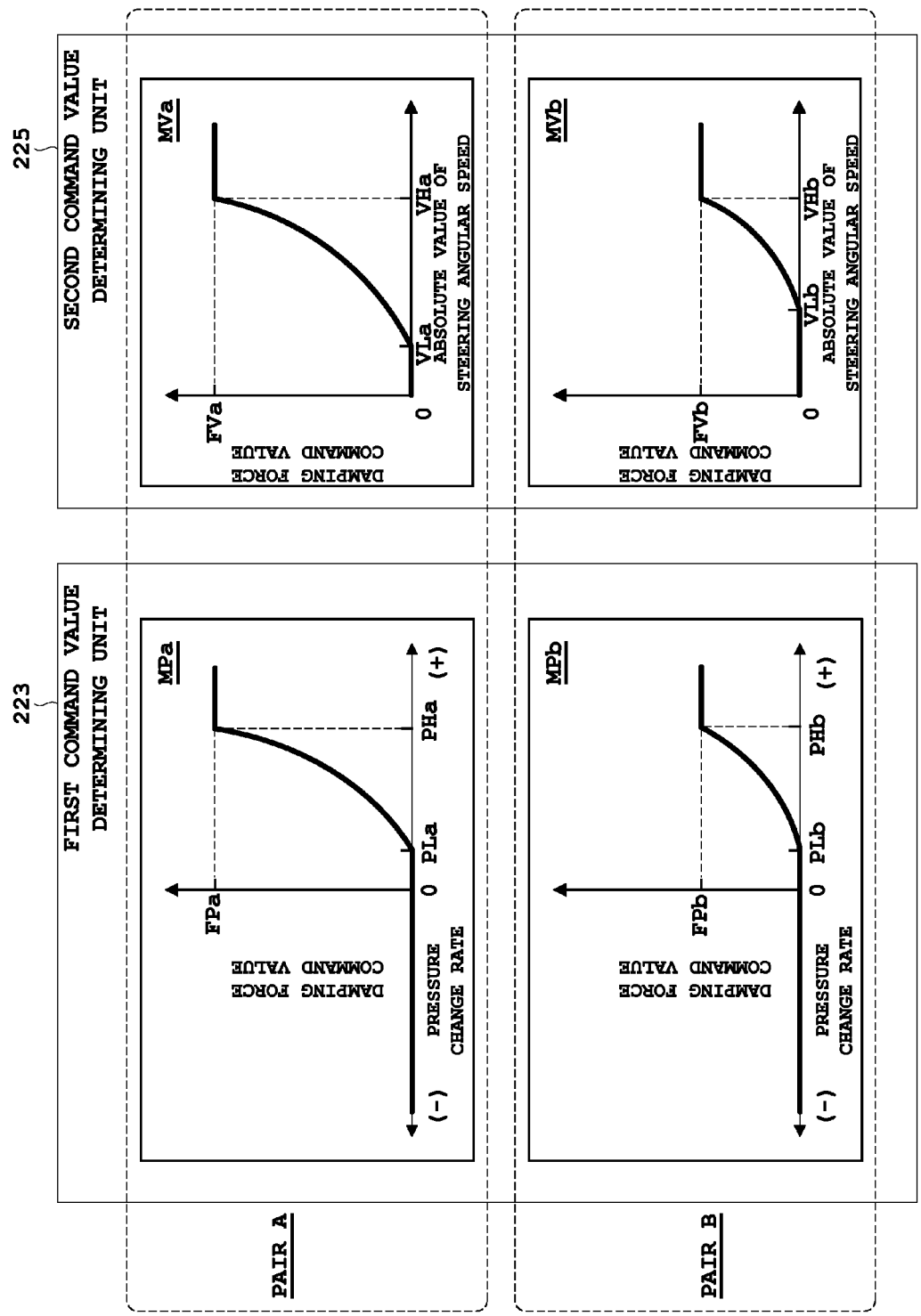
FIG. 6 is a view schematically showing examples of pressure control maps and steering angle control maps.

The pressure control maps MP and steering angle control maps MV will be described in greater detail. FIG. 6 is a view schematically showing examples of pressure control maps MP and steering angle control maps MV.

The pressure control maps MPa and MPb preferably are graphs with the horizontal axis representing the pressure change rate and the vertical axis representing the damping force command value. It is assumed that the pressure change rate takes positive values when the pressure increases, and that the pressure change rate takes negative values when the pressure decreases. The steering angle control maps MVa and MVb are graphs with the horizontal axis representing the absolute value of the steering angular speed and the vertical axis representing the damping force command value.

The pressure control map MPa and steering angle control map MVa preferably are correlated with each other, and define a pair (set, combination) A. Similarly, the pressure control map MPb and steering angle control map MVb preferably are correlated with each other, and define a pair B. Consequently, the map designating switch 203, only by selecting one of the pairs, A or B, can designate the pressure control map MP and steering angle control map MV at once.

The pressure control map MPa is preferably set as follows. When the pressure change rate is equal to or less than a predetermined value PLa, the damping force command value is at a minimum. The predetermined value PLa is positive. When the pressure change rate is larger than the predetermined value PLa, the damping force command value is larger than the minimum. More particularly, in a region where the pressure change rate is larger than the predetermined value PLa and is equal to or less than a threshold value PHa, the damping force command value increases with the pressure change rate. Note that the threshold value PHa is larger than the predetermined value PLa. In the region of the pressure change rate from the predetermined value PLa to the threshold value PHa, the ratio of an amount of increase (ratio of change) of the damping force command value to an amount of increase of the pressure change rate becomes larger as the pressure change rate increases. When the pressure change rate is larger than the threshold value PHa, the damping force command value is a constant value FPa. The constant value FPa is equal to the damping force command value at a time when the pressure change rate is at the threshold value PHa. Consequently, the damping force command value is continuous adjacent the threshold value PHa. In other words, the damping force command value does not change stepwise adjacent the threshold value PHa. Note that the constant value FPa is larger than the minimum of the damping force command value. The constant value FPa may be, or may not be, a maximum of the damping force command value. The phrase "minimum of the damping force command value" means a minimum in a range available to the damping force command value. The phrase "maximum of the damping force command value" means a maximum in the range available to the damping force command value.

The pressure control map MPb has a characteristic curve similar to that of the pressure control map MPa, but its damping force command value is generally low, compared with the pressure control map MPa. Specifically, a predetermined value PLb in the pressure control map MPb is set equal to or larger than the predetermined value PLa in the pressure control map MPa. A constant value FPb in the pressure control map MPb is set less than the constant value FPa in the pressure control map MPa.

The technical significance of these pressure control maps MPa and MPb is as follows. The pressure change rate is at least to some extent relevant to vibration of the steering device caused by a disturbance. For example, the steering device tends to be vibrated by a disturbance acting on the front wheel 15 immediately after an increase in the pressure of the front forks 13. According to the pressure control maps MPa and MPb, even when the steering device is not actually vibrated, it is possible for a damping force to be generated at a point of time when, with a pressure increase, the steering device has fallen into a state of being easily vibrated.

Here, times when the pressure of the front forks 13 increases may, for example, be when the two-wheeled motor vehicle 1 travels into a corner area or slows down, or when the front wheel 15 receives a disturbance as the front wheel 15 travels on a protrusion of the traveling surface or the like. However, in any case, a period of pressure increase is extremely short, and ends in an instant. On the other hand, times when the pressure of the front forks 13 does not increase may, for example, be the following scenes, besides immediately after the two-wheeled motor vehicle 1 travels into a corner area. That may be when driving the two-wheeled motor vehicle 1 at constant speed, when traveling around a corner at constant speed, when accelerating, when traveling out of a corner area, or when making the two-wheeled motor vehicle 1 jump.

According to the pressure control maps MPa and MPb described above, only when the pressure change rate is larger than the predetermined value PLa, the damping force command value becomes larger than the minimum. At other times, the damping force command value is at the minimum. As a result, the damping force substantially acts on the steering device to render the steering device difficult to move, only for a brief period (moment) when the pressure increases at a rate higher than constant. At this time, the greater the pressure change rate is, the greater the damping force becomes, rendering the steering device still more difficult to move. However, when the pressure change rate becomes still greater, the damping force will become constant and will not become excessive, more than necessary. After the above moment, the damping force acting on the steering device will return to the minimum again to render the steering device easily movable.

The pressure of the front forks 13 corresponds to a stroke length (amount of expansion and contraction) of the front forks 13, and corresponds to an upward load the front wheel 15 receives from the traveling surface. The pressure change rate corresponds to a speed of expansion and contraction of the front forks 13, and corresponds to a change rate of a load on the front wheel 15. When the pressure change rate is positive, the front forks 13 are contracting, and the load on the front wheel 15 is increasing. Thus, the pressure change rate is a value (indicator) corresponding to the change rate of the load acting on the front wheel 15. Therefore, the foregoing description may be read as "the load acting on the front wheel 15" instead of "the pressure on the front forks 13", and may be read as "the change rate of the load on the front wheel 15" instead of "the pressure change rate".

With the two types of pressure control maps MPa and MPb provided, the pressure control maps MPa and MPb may be used selectively according to specific situations. This enables generation of a damping force of an appropriate magnitude.

When, for example, the grip of the front wheel 15 and the traveling surface is relatively high and the front wheel 15 does not easily slip, the steering device is vibrated by a disturbance with a relatively strong force. In such a case, a relatively strong damping force is capable of being generated by using the pressure control map MPa, to be able to significantly reduce or prevent vibration of the steering device effectively.

When, for example, the grip of the front wheel 15 and the traveling surface is relatively low and the front wheel 15 tends to slip easily, vibration of the steering device by a disturbance is relatively small. In the first place, the front wheel 15, even when a disturbance acts thereon, may slip straight on without changing directions, and then vibration of the steering device itself will not happen easily. In such a case, by using the pressure control map MPb, vibration of the steering device is prevented sufficiently with a relatively small damping force. Rather, the smaller damping force is all the more desirable in this case. When the grip is low, the rider tries to perceive the grip (feeling of ground contact) of the front wheel 15 through the steering device. In this case, the smaller damping force makes it the easier for the rider to attain an operational feeling.

The grip is high, for example, when running on a leveled traveling surface, a paved traveling surface or a high grip course, or when running at a time of fine weather. The grip is low, for example, when running on a rugged surface, an unpaved traveling surface or a low grip course, or when running at a time of rainy or snowy weather.

The criteria for selectively using the pressure control maps MPa and MPb are not limited to the traveling surface conditions or the weather. The pressure control maps MPa and MPb may be used selectively, for example, according to the weight and traveling speed of the two-wheeled motor vehicle 1.

The steering angle control map MVa is preferably set as follows. When the absolute value of the steering angular speed is equal to or less than a predetermined value VLa, the damping force command value is at a minimum. The predetermined value VLa is positive. When the absolute value of the steering angular speed is larger than the predetermined value VLa, the damping force command value is larger than the minimum. More particularly, in a region where the absolute value of the steering angular speed is larger than the predetermined value VLa and is equal to or less than a threshold value VHa, the damping force command value increases with the absolute value of the steering angular speed. Note that the threshold value VHa is larger than the predetermined value VLa. In the region from the predetermined value VLa to the threshold value VHa, the ratio of an amount of increase (ratio of change) of the damping force command value to an amount of increase of the absolute value of the steering angular speed becomes larger as the absolute value of the steering angular speed increases. When the absolute value of the steering angular speed is larger than the threshold value VHa, the damping force command value is a constant value FVa. The constant value FVa is equal to the damping force command value at a time when the absolute value of the steering angular speed is at the threshold value VHa. Therefore, the damping force command value is continuous adjacent the threshold value VHa. In other words, the damping force command value will not change stepwise adjacent the threshold value VHa. Note that the constant value FVa is larger than the minimum of the damping force command value. The constant value FVa may be, or may not be, a maximum of the damping force command value. The constant value FVa may be, or may not be, substantially equal to the constant value FPa in the pressure control map MPa.

The steering angle control map MVb has a characteristic curve similar to that of the steering angle control map MVa, but its damping force command value is generally low, compared with the steering angle control map MVa. Specifically, a predetermined value VLb in the steering angle control map MVb is set equal to or larger than the predetermined value VLa in the steering angle control map MVa. A constant value FVb in the steering angle control map MVb is set less than the constant value FVa in the steering angle control map MVa. The constant value FVb may be, or may not be, substantially equal to the constant value FPb in the pressure control map MPb.

The technical significance of these steering angle control maps MVa and MVb is as follows. According to the steering angle control maps MVa and MVb, a damping force is generated when the steering device is actually vibrated.

Specifically, when the absolute value of the steering angular speed is equal to or less than the predetermined value VLa, the damping force acting on the steering device is the minimum, and it is easy for the steering device to move. When the absolute value of the steering angular speed is larger than the predetermined value VLa, the damping force substantially acts on the steering device which makes it difficult for the steering device to move. At this time, the larger the absolute value of the steering angular speed is, the greater becomes the damping force, rendering the steering device still more difficult to move. However, when the absolute value of the steering angular speed becomes still larger, the damping force will become constant and will not become excessive, more than necessary.

With the two types of steering angle control maps MVa and MVb provided, the steering angle control maps MVa and MVb preferably are used selectively according to specific situations. This enables generation of a damping force of an appropriate magnitude.

When, for example, the grip of the front wheel 15 and the traveling surface is relatively high, the steering device tends to be vibrated by a relatively strong force. In other words, when the grip is high and the steering device is vibrated at a certain steering angular speed, the steering device is in many cases vibrated by a greater force than when the grip is low and the steering device is vibrated at the same steering angular speed. Therefore, when the grip is high, a relatively strong damping force preferably is generated by using the steering angle control map MVa, to be able to significantly reduce or prevent vibration of the steering device effectively. On the other hand, when the grip is low, vibration of the steering device is prevented sufficiently with a relatively small damping force by using the steering angle control map MVb.

The criteria to selectively use the steering angle control maps MVa and MVb are not limited to the traveling surface conditions or the weather. A selective use may be made, for example, according to the weight and traveling speed of two-wheeled motor vehicle 1.

Vibration of the steering device occurs in various scenes. Apart from when the front wheel 15 receives a disturbance from the traveling surface, vibration of the steering device occurs also when the rear wheel 32 slides sideways relative to the direction of movement (in other words, when the rear wheel 32 and main frame 3 rotate about the steering shaft 7).

Figure 7:
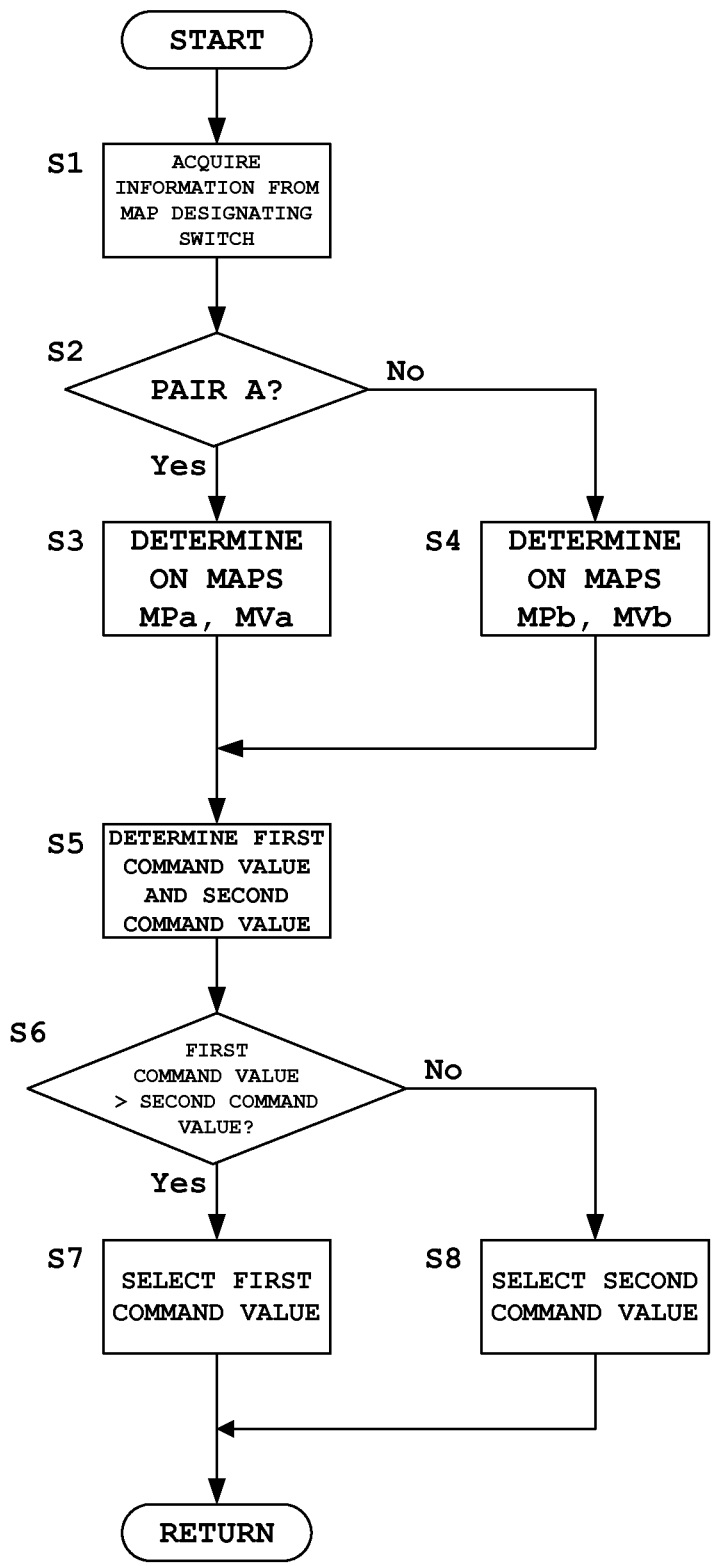
FIG. 7 is a flow chart showing operation of the steering damper control apparatus.

Next, operation of the steering damper control apparatus 201 in Preferred Embodiment 1 will be described. FIG. 7 is a flow chart showing a non-limiting example of an operation of the steering damper control apparatus 201.

Steps S1-S4

The map switching unit 221 acquires a command inputted to the map designating switch 203. Then, based on this command, the pressure control map MP to which the first command value determining unit 223 will refer is switched to one of the pressure control maps MPa and MPb. Similarly, the map to which the second command value determining unit 225 will refer is switched to one of the steering angle control maps MVa and MVb.

Specifically, the map switching unit 221 checks whether the command inputted to the map designating switch 203 designates pair A or not. When pair A is designated, it determines on the pressure control map MPa and steering angle control map MVa. Otherwise, it determines on the pressure control map MPb and steering angle control map MVb.

Step S5

The pressure change rate calculator 211 acquires a detection result of the pressure sensor 16. Then, it calculates a pressure change rate. The calculated pressure change rate is outputted to the first command value determining unit 223. The first command value determining unit 223 refers to the designated pressure control map MP, and determines a damping force command value (first command value) corresponding to the pressure change rate.

Similarly, the steering angle change rate calculator 216 acquires a detection result of the steering angle sensor 109. Then, it calculates a steering angular speed. The calculated steering angular speed is outputted to the second command value determining unit 225. The second command value determining unit 225 refers to the designated steering angle control map MV, and determines a damping force command value (second command value) corresponding to the steering angular speed.

Step S6

The command value selecting unit 227 compares the first command value and the second command value, and checks whether or not the first command value is larger than the second command value. When the result shows that the first command value is larger, the operation proceeds to step S7. Otherwise, the operation proceeds to step S8.

Step S7

The command value selecting unit 227 selects the first command value, and outputs the first command value to the damper driver 219. The damper driver 219 passes an electric current corresponding to the first command value through the electromagnet 37 (coil 77). The steering damper 23 generates a damping force corresponding to the electric current.

Step S8

The command value selecting unit 227 selects the second command value, and outputs the second command value to the damper driver 219. The damper driver 219 passes an electric current corresponding to the second command value through the electromagnet 37 (coil 77). The steering damper 23 generates a damping force corresponding to the electric current.

Thus, according to the steering damper control apparatus 201 in Preferred Embodiment 1, the steering damper 23 is preferably controlled based on the detection result of the pressure sensor 16 and the detection result of the steering angle sensor 109. In other words, the steering damper 23 is controlled preferably by selectively using the first command value which is a damping force command value corresponding to the pressure change rate, and the second command value which is a damping force command value corresponding to the steering angular speed.

By using the detection result of the pressure sensor 16 as a basis, a damping force preferably is generated when the pressure is increasing. This renders the steering device difficult to move when the steering device becomes easily vibrated. Even when the steering device is not actually vibrated, it significantly reduces or inhibits vibration of the steering device in a preventive way.

According to the steering angle sensor 109, a damping force preferably is generated when the steering device is actually vibrated. Consequently, and naturally, vibration of the steering device is inhibited effectively.

Thus, according to the steering damper control apparatus 201, it can respond, with increased effect, to various vibrations of the steering device due to a wide range of disturbances.

The command value selecting unit 227 selects the larger of the first command value and the second command value. This enables a mutually complementary execution of the control based on the detection result of the pressure sensor 16 and the control based on the detection result of the steering angle sensor 109. That is, a damping force preferably is generated when the pressure change rate is increasing although the steering device is not being vibrated, and a damping force preferably is generated when the steering device is vibrating although the pressure change rate is not increasing. Consequently, when, for example, the two-wheeled motor vehicle 1 travels into a corner area or when it slows down, vibration of the steering device is prevented effectively, and when traveling out of a corner area or when it accelerates, the rear wheel 32 is effectively inhibited from skidding.

The first command value determining unit 223, which preferably includes the plural types of pressure control maps MPa and MPb, preferably uses the pressure control maps MPa and MPb selectively according to specific situations.

The second command value determining unit 225, which preferably includes the plural types of pressure control maps MVa and MVb, preferably uses the pressure control maps MVa and MVb selectively according to specific situations.

The map designating switch 203 preferably is configured to designate conveniently one of the pressure control maps MPa and MPb to which the first command value determining unit 223 refers. Further, the map designating switch 203 preferably is also configured to designate conveniently one of the steering angle control maps MVa and MVb to which the second command value determining unit 225 refers.

Since each pressure control map MP defines a set with one of the steering angle control maps MV, the map designating switch 203 designates the pressure control map MP and steering angle control map MV en bloc.

The pressure control map MP includes a region which defines at least a portion of the range where the pressure change rate is positive, and in which the damping force command value increases with the pressure change rate (that is, a region in which the pressure change rate is larger than the predetermined value PLa/PLb and equal to or less than the threshold value PHa/PHb). In other words, in the range where the pressure change rate is from the predetermined value PLa/PLb to the threshold value PHa/PHb, the damping force command value increases with the pressure change rate. Therefore, even when a change of the pressure of the front forks 13 is steep, vibration of the steering device is inhibited effectively. In this region in particular, the higher the pressure change rate is, the larger the ratio of change (gradient) of the damping force command value is to the pressure change rate, to increase the damping force sharply. Therefore, vibration of the steering device is significantly reduced or prevented with an increased effect.

When the pressure change rate is larger than the threshold value PHa/PHb, the damping force command value is the constant value FPa/FPb. Therefore, since an excessive damping force greater than is necessary is not generated, the rider's burden is reduced conveniently. Especially, the constant value FPa/FPb is equal to the damping force command value when the pressure change rate is at the threshold value PHa/PHb. Therefore, since the magnitude of the damping force command value (damping force) is continuous adjacent the threshold value PHa/PHb, it is possible to avoid an unnatural change in controllability (easiness of movement) of the steering device.

When the pressure change rate is less than the predetermined value PLa/PLb, the damping force command value is a minimum. Consequently, the damping force substantially acts on the steering device only at a moment when the pressure of the front forks 13 increases at a certain rate or higher. This conveniently prevents the controllability of the steering device from being impaired, while also preventing vibration of the steering device. The rider is thus able to operate the steering device easily when making the two-wheeled motor vehicle 1 jump, for example.

The steering angle control map MV includes a region in which the damping force command value increases with the absolute value of the steering angular speed (that is, a region in which it is larger than the predetermined value VLa/VLb and equal to or less than the threshold value VHa/VHb). In other words, in the range where the absolute value of the steering angular speed is from the predetermined value VLa/VLb to the threshold value VHa/VHb, the damping force command value increases with the absolute value of the steering angular speed. Therefore, even when the steering angular speed is high, vibration of the steering device is prevented effectively. In this region in particular, the larger the absolute value of the steering angular speed is, the larger the ratio of change (gradient) of the damping force command value is to the absolute value of the steering angular speed, to increase the damping force sharply. Therefore, vibration of the steering device is prevented with increased effect.

When the absolute value of the steering angular speed is larger than the threshold value VHa/VHb, the damping force command value is the constant value FVa/FVb. Therefore, since an excessive damping force greater than is necessary is not generated, the rider's burden is lightened conveniently. Especially, the constant value FVa/FVb is equal to the damping force command value when the absolute value of the steering angular speed is at the threshold value VHa/VHb.

Therefore, since the magnitude of the damping force command value (damping force) is continuous adjacent the threshold value VHa/VHb, it is possible to avoid an unnatural change in controllability (easiness of movement) of the steering device.

When the absolute value of the steering angular speed is equal to or less than the predetermined value VLa/VLb, the damping force command value is a minimum. Consequently, the damping force substantially acts on the steering device only when the absolute value of the steering angular speed is larger than the predetermined value VLa/VLb. This conveniently prevents the controllability of the steering device being impaired, while preventing vibration of the steering device. The rider is thus able to operate the steering device easily when making the two-wheeled motor vehicle 1 jump, for example.

Since the steering damper 23 has the magnetic fluid M, and the electromagnet 37 configured to apply a magnetic field to the magnetic fluid M, the steering damper 23 is able to generate a damping force even when the steering device is not moving (even when it is not vibrating). Therefore, even when the steering device is not actually vibrated, the damping force corresponding to the damping force command value is generated conveniently.

The steering damper 23, since it preferably is the "shear type" which uses a shearing force of the magnetic fluid M as a damping force, significantly reduces or minimizes the damping force when the damping force command value is at a minimum. Therefore, when the damping force is a minimum, an operational feeling of the steering device is made still lighter, and a lowering of the controllability of the steering device is prevented with increased effect.

The two-wheeled motor vehicle 1, since it includes the steering damper control apparatus 201 described above, prevents vibration of the steering with increased effect. Therefore, the rider is able to control the steering device comfortably to drive the two-wheeled motor vehicle 1.

Preferred Embodiment 2

Preferred Embodiment 2 of the present invention will be described next. The constructions of the two-wheeled motor vehicle 1 and steering damper 23 in Preferred Embodiment 2 preferably are substantially the same as in Preferred Embodiment 1. Therefore, the steering damper control apparatus 201 will mainly be described hereinafter. Components identical to those of Preferred Embodiment 1 are shown with the same reference characters and numerals, and will not particularly be described to avoid repetition.

Figure 8:
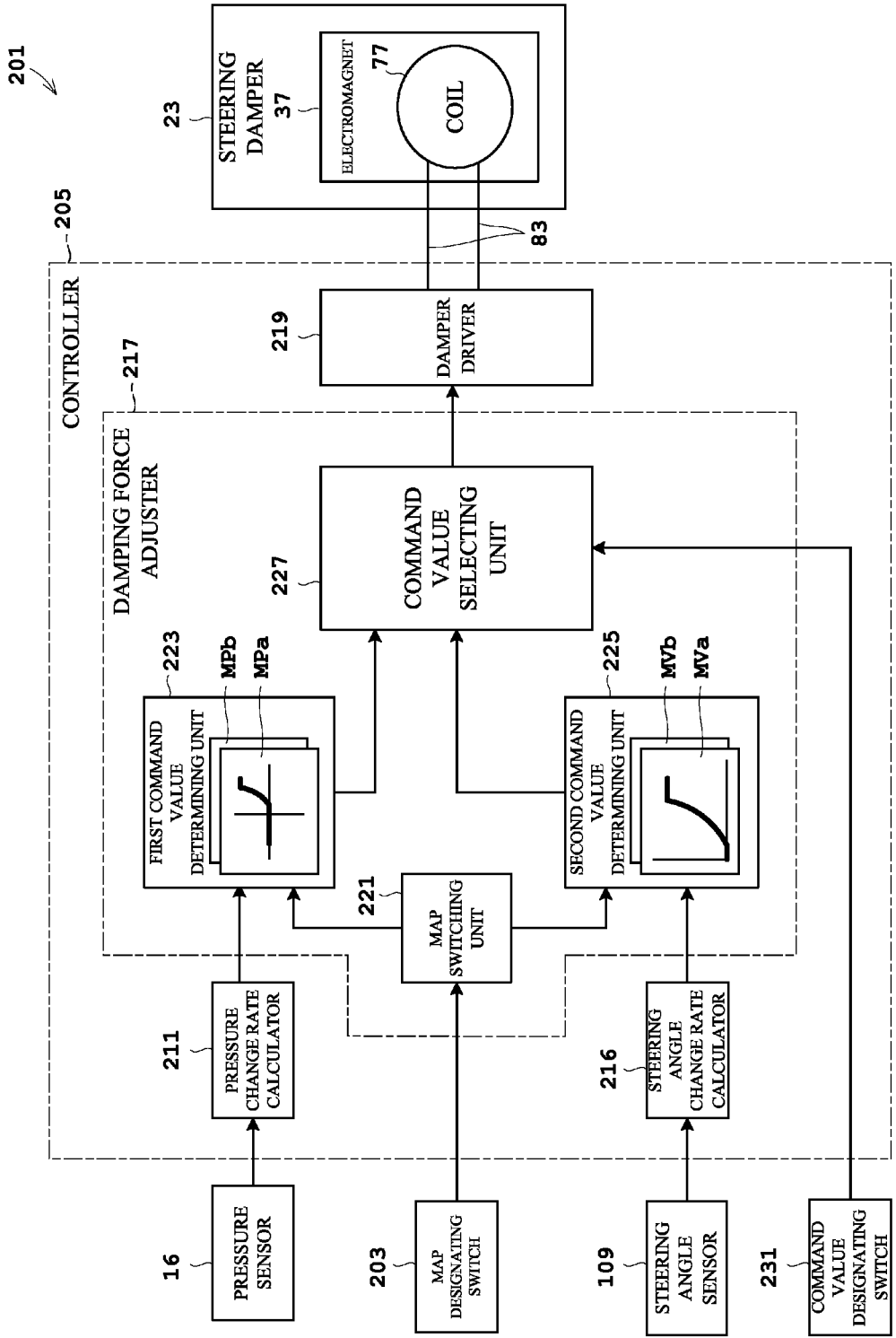
FIG. 8 is a block diagram showing an outline of a steering damper control apparatus in Preferred Embodiment 2 of the present invention.

FIG. 8 is a view showing an outline of the steering damper control apparatus 201 according to Preferred Embodiment 2. The steering damper control apparatus 201 further includes a command value designating switch 231.

The command value designating switch 231 receives commands to designate command values to be selected. Specifically, the command value designating switch 231 receives a command to designate the first command value, a command to designate the second command value, and a command to designate an auto select. The commands inputted to the command value designating switch 231 are inputted to the controller 205. The command value designating switch 231 is attached to the steering handle 19 (not shown). The rider is able to operate the command value designating switch 231. The command value designating switch 231 corresponds to a command value designator.

The command value selecting unit 227 selects one of the first command value and the second command value based on the command inputted to the command value designating switch 231. Specifically, when the command inputted to the command value designating switch 231 is a command which designates the first command value, the first command value is selected regardless of the magnitude relation between the first command value and the second command value. When it is a command which designates the second command value, the second command value is selected similarly on a mandatory basis. When it is a command which designates the auto select, the larger of the first command value and the second command value is selected.

Figure 9:
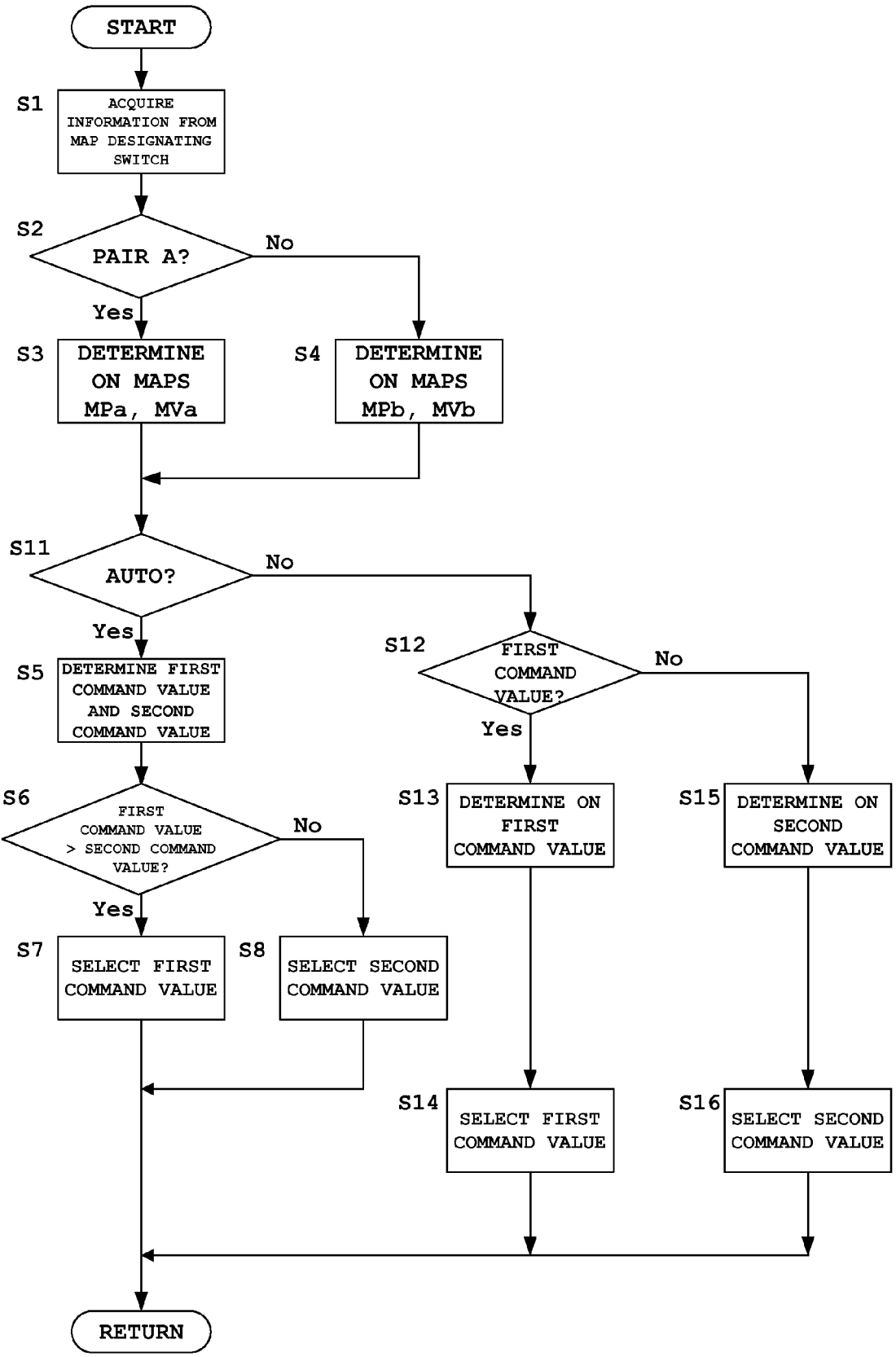
FIG. 9 is a flow chart showing operation of the steering damper control apparatus.

Next, operation of the steering damper control apparatus 201 in Preferred Embodiment 2 will be described. FIG. 9 is a flow chart showing operation of the steering damper control apparatus 201. As shown, steps S11 to 16 are added to the operation of the steering damper control apparatus 201 in Preferred Embodiment 1.

Steps S1 to S4

The map switching unit 221, based the command inputted to the map designating switch 203, switches the pressure control maps MP and the steering angle control maps MV, respectively.

Steps S11, S12

The damping force adjuster 217 checks whether the command inputted to the command value designating switch 231 is the auto select, the first command value or the second command value. When the result indicates the auto select, the operation proceeds to step S5. In the case of the first command value, the operation proceeds to step S13. In the case of the second command value, the operation proceeds to step S15.

Steps S5 to S8

The first command value determining unit 223 determines the first command value, and the second command value determining unit 225 determines the second command value. The command value selecting unit 227 selects the larger of the first command value and the second command value. The damper driver 219 passes an electric current corresponding to the selected command value through the electromagnet 37 (coil 77).

Steps S13, S14

The first command value determining unit 223 determines the first command value, and the command value selecting unit 227 selects the first command value. The damper driver 219 passes an electric current corresponding to the first command value through the electromagnet 37 (coil 77). The steering damper 23 generates a damping force corresponding to the electric current.

Step S15, S16

The second command value determining unit 225 determines the second command value, and the command value selecting unit 227 selects the second command value. The damper driver 219 passes an electric current corresponding to the second command value through the electromagnet 37 (coil 77). The steering damper 23 generates a damping force corresponding to the electric current.

According to the steering damper control apparatus 201 in Preferred Embodiment 2, as in Preferred Embodiment 1 described hereinbefore, it can respond, with increased effect, to various vibrations of the steering device due to a wide range of disturbances.

The command value designating switch 231 enables the damping force adjuster 217 to change easily the process of selecting the first command value and the second command value. Specifically, the steering damper 23 preferably is controlled based only on the first command value according to the pressure change rate, or based only on the second command value according to the steering angle sensor 109. Or, the steering damper 23 can be controlled based on the larger of the first command value and the second command value. Thus, the control modes of the steering damper control apparatus 201 are capable of being changed easily.

The present invention is not limited to the forgoing preferred embodiments, and may be modified in at least the following ways.

Preferred Embodiments 1 and 2 described above preferably include the map designating switch 203, but this is not limitative. That is, the map designating switch 203 may be omitted. In this modified preferred embodiment, a variation may be made to switch the pressure control maps MP and/or the steering angle control maps MV based on the steering angular speed, the vehicle speed and so on. Or a variation may be made to omit the process of switching the pressure control maps MP and steering angle control maps MV, in which the first command value determining unit 223 refers to a pressure control map MP set beforehand, and the second command value determining unit 225 refers to a steering angle control map MV set beforehand.

In Preferred Embodiments 1 and 2 described above, the first command value determining unit 223 preferably includes two types of pressure control maps MPa and MPb, but this is not limitative. The first command value determining unit 223 may be varied to have three or more pressure control maps MP, for example. The first command value determining unit 223 may be varied to have a single pressure control map MP, for example. Similar variations may be made in the second command value determining unit 225.

Preferred Embodiments 1 and 2 described above exemplify the pressure control maps MP, but the pressure control maps MP can be varied as appropriate. For example, a variation may be made such that, in the region larger than the predetermined value PLa/PLb and equal to or less than the threshold value PHa/PHb, the damping force command value increases at a constant rate with an increase in the pressure change rate. The predetermined value PLa/PLb may be changed to zero. Or a variation may be made such that the damping force command value does not become constant even when the pressure change rate is larger than the threshold value PHa/PHb. Similar variations may be made in the steering angle control maps MV.

Preferred Embodiments 1 and 2 described above exemplify pair A and pair B of the pressure control maps MP and steering angle control maps MV, but this is not limitative. A variation may be made to provide the following pairs of pressure control maps MP and steering angle control maps MV.

Figure 10:
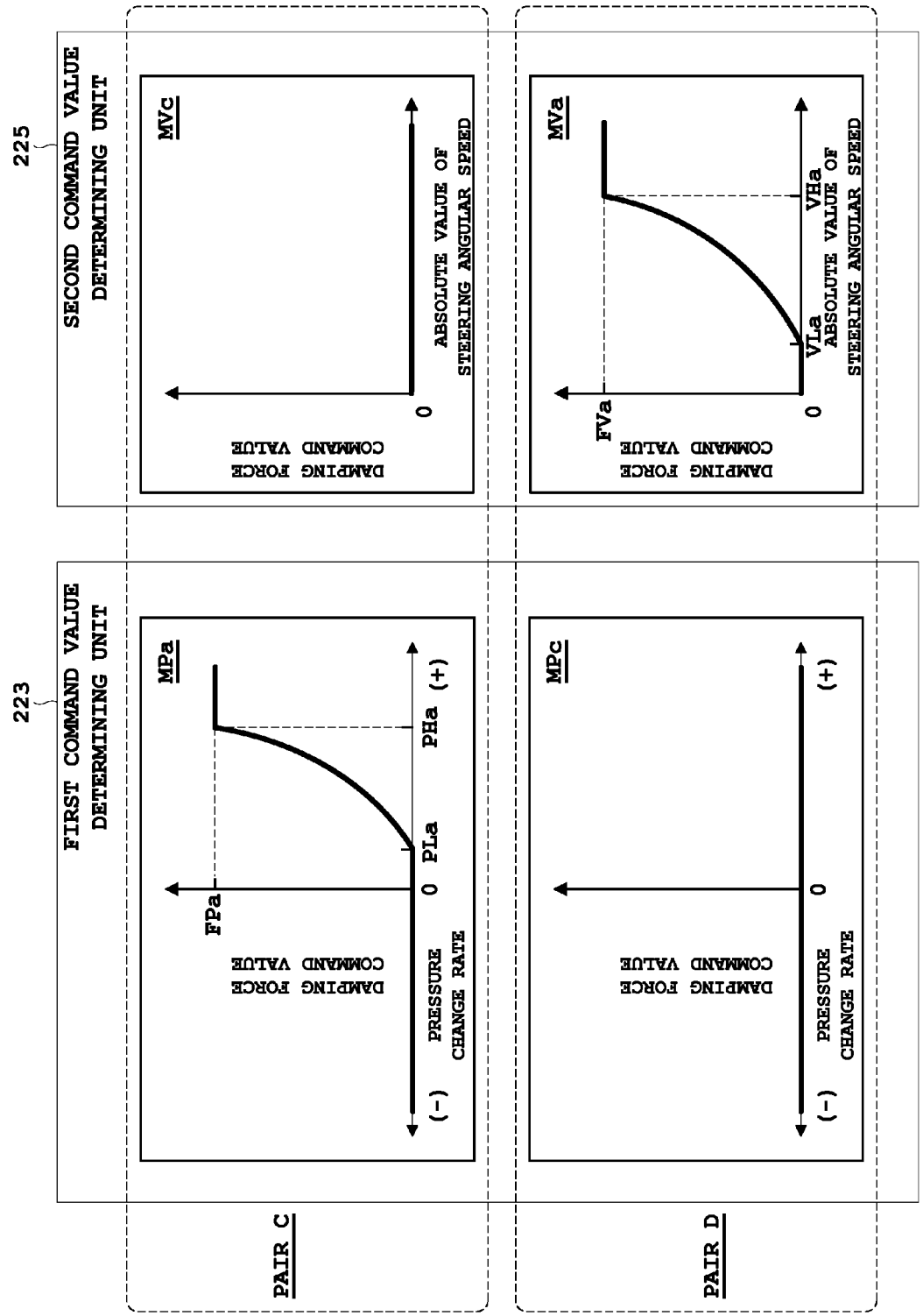
FIG. 10 is a view schematically showing examples of pressure control maps and steering angle control maps according to a modified preferred embodiment of the present invention.

Reference is made to FIG. 10. FIG. 10 is a schematic view showing examples of pressure control maps MP and steering angle control maps MV according to a modified preferred embodiment of the present invention. As shown, pair C preferably includes pressure control map MPa and steering angle control map MVc. Pair D preferably includes pressure control map MPc and steering angle control map MVa. In the pressure control map MPc, the damping force command value is always the minimum regardless of the pressure change rate. In the steering angle control map MVc, the damping force command value is always the minimum regardless of the steering angular speed.

Thus, the first command value is preferably equal to or larger than the second command value since the maximum of the damping force command value in the steering angle control map MVc is equal to or less than the minimum of the damping force command value in the pressure control map MPa. By designating pair C, therefore, the steering damper 23 preferably is controlled based only on the first command value corresponding to the pressure change rate.

Similarly, the second command value is preferably equal to or larger than the first command value since the maximum of the damping force command value in the pressure control map MPc is equal to or less than the minimum of the damping force command value in the steering angle control map MVa. By designating pair D, therefore, the steering damper 23 preferably is controlled based only on the second command value corresponding to the steering angular speed.

In the case of this modified preferred embodiment, both pairs C and D may be provided, or only one of pairs C and D may be provided. Further, pairs A and B may be provided, or at least one of pairs A and B may be omitted.

In Preferred Embodiments 1 and 2 described above, a command to designate pair A or B preferably is inputted to the map designating switch 203, but this is not limitative. A command to designate one of the pressure control maps MPa and MPb, and a command to designate one of the steering angle control maps MVa and MVb, may be individually inputted to the map designating switch 203.

In Preferred Embodiment 2 described above, the command value designating switch 231 preferably receives three types of commands (the first command value, the second command value and the auto select), but this is not limitative. For example, a variation may be made to receive two types of commands. For example, a variation may be made to receive a command to designate the first command value or the auto select, or a variation may be made to receive a command to designate the second command value or the auto select. Or a variation may be made to receive a command to designate the first command value or the second command value.

Preferred embodiments 1 and 2 described above exemplify the pressure sensor 16 preferably as a load information detector, but this is not limitative. For example, changes can be made as appropriate to other detectors for detecting information relating to loads acting on the front wheel 15.

Reference is made to FIGS. 11A through 11D. FIGS. 11A to 11D are views showing modified preferred embodiments of the sensor configured to detect information relating to loads acting on the front wheel 15. FIGS. 11A to 11D are enlarged views of portions of the front forks 13 when seen from the front of the two-wheeled motor vehicle 1.

As shown in FIG. 11A, strain gauges 241 and 242 may be provided to detect a load acting on an axle 240. Preferably, the respective strain gauges 241 and 242 are arranged on an upper portion and a lower portion of the axle 240 of the front wheel 15. Consequently, the load acting on the axle 240 is detected with high accuracy. The load acting on the axle 240 corresponds to a load acting on the front wheel 15. Therefore, a change rate of the load acting on the front wheel 15 is acquired from detection results of the strain gauges 241 and 242.

As shown in FIG. 11B, a speed sensor 243 may be provided to detect the speed of expansion and contraction of the front forks 13. The speed sensor 243 is constructed to include a coil, for example, and may detect the speed of expansion and contraction of the front forks 13 based on variations in magnetic flux. Alternatively, the speed sensor 243 may be an optical surface speed sensor using laser light, for example. The speed of expansion and contraction of the front forks 13 is a value corresponding to the change rate of the load on the front wheel 15.

As shown in FIG. 11C, an acceleration sensor 245 may be provided to detect acceleration in the axial direction (direction of expansion and contraction) of the front forks 13. The detection result of the acceleration sensor 245 corresponds to what results from a further time differentiation of the change rate of the load on the front wheel 15. Therefore, a value correspond to the change rate of the load acting on the front wheel 15 is acquired from a detection result of the acceleration sensor 245.

As shown in FIG. 11D, an acceleration sensor 247 may be provided to detect acceleration in the up-and-down direction of the axle 240. The detection result of the acceleration sensor 247 corresponds to what results from a further time differentiation of the change rate of the load on the front wheel 15. Therefore, a value correspond to the change rate of the load acting on the front wheel 15 is acquired from a detection result of the acceleration sensor 247.

Though not shown, in place of the pressure sensor 16, a stroke sensor may be provided to detect an amount of stroke of the front forks 13. The amount of stroke of the front forks 13 corresponds to the load acting on the front wheel 15. Therefore, a change rate of the load acting on the front wheel 15 is acquired from a detection result of the stroke sensor.

Each of the various sensors 241, 242, 243, 245 and 247 and the stroke sensor described above corresponds to a load information detector.

In Preferred Embodiments 1 and 2, the pressure change rate calculator 211 is preferably included in the controller 205, but this is not limitative. For example, a variation may be made to provide the pressure change rate calculator 211 as integrated with the pressure sensor 16. Similarly, a variation may be made to provide the steering angle change rate calculator 216 as integrated with the steering angle sensor 109.

Preferred embodiments 1 and 2 described above exemplify the construction of the steering damper 23, but this is not limitative. That is, the construction of the steering damper 23 may be varied as appropriate. The entire magnetic fluid chamber 41 may be filled with the magnetic fluid M. A portion of the magnetic fluid chamber 41 may hold the magnetic fluid M, with the rest having air or the like.

In the foregoing preferred embodiments, the two-wheeled motor vehicle 1 preferably is a two-wheeled motor vehicle 1 including a single front wheel 15 and a single rear wheel 32, for example, but this is not limitative. For example, a change may be made to a three-wheeled vehicle having two front wheels, or a three-wheeled vehicle having two rear wheels. Or a change may be made to a four-wheeled vehicle having two front wheels and two rear wheels. Application may be made also to two-wheeled motor vehicles such as a motor scooter, and a moped other than the motor scooter type, to an ATV (All Terrain Vehicle four-wheeled buggy), and to a saddle riding type vehicle such as a snowmobile, for example. In such modified preferred embodiments, the construction of front forks 13 can be selected or varied as appropriate. The suspension may include a suspension mechanism other than the front forks 13.

In the foregoing preferred embodiments, the two-wheeled motor vehicle 1 preferably includes the engine 29 as the power source, but this is not limitative. For example, a variation may be made to include an electric motor as the power source.

The foregoing preferred embodiments and each of the modified preferred embodiments described above may be further varied as appropriate by replacing or combining each component with a component of another modified preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A steering damper control apparatus comprising:
   a damper configured to generate a damping force which acts on a steering device;
   a load information detector configured to detect information relating to a load received by a front wheel;
   a steering angle detector configured to detect a steering angle of the steering device; and
   a damping force adjuster configured to adjust the damping force of the damper with one of a first command value which is a damping force command value according to a change rate of the load or a value corresponding to the change rate, and a second command value which is a damping force command value according to a steering angular speed, based on each detection result of the load information detector and the steering angle detector.

2. The steering damper control apparatus according to claim 1, wherein the damping force adjuster is configured to select a larger of the first command value and the second command value.

3. The steering damper control apparatus according to claim 1, wherein:
   the damping force adjuster includes plural types of load control information correlating the change rate of the load or the value corresponding to the change rate and the damping force command value, and plural types of steering angle control information correlating the steering angular speed and the damping force command value; and
   the apparatus further comprises an information designator configured to input a command to designate the load control information and the steering angle control information to which the damping force adjuster refers.

4. The steering damper control apparatus according to claim 3, wherein:
   each type of the load control information defines a pair with one type of the steering angle control information; and
   the information designator is configured to designate one of the pairs.

5. The steering damper control apparatus according to claim 4, wherein, in any one of the pairs, a maximum damping force command value in the load control information is smaller than a minimum damping force command value in the steering angle control information.

6. The steering damper control apparatus according to claim 4, wherein, in any one of the pairs, a maximum damping force command value in the steering angle control information is smaller than a minimum damping force command value in the load control information.

7. The steering damper control apparatus according to claim 1, wherein:
   the damping force adjuster includes plural types of load control information correlating the change rate of the load or the value corresponding to the change rate and the damping force command value; and
   the apparatus further comprises an information designator configured to input a command to designate the load control information to which the damping force adjuster refers.

8. The steering damper control apparatus according to claim 1, wherein:
   the damping force adjuster includes plural types of steering angle control information correlating the steering angular speed and the damping force command value; and the apparatus further comprises an information designator configured to input a command to designate the steering angle control information to which the damping force adjuster refers.

9. The steering damper control apparatus according to claim 3, wherein at least one type of the load control information includes at least one partial region of a range where the change rate of the load or the value corresponding to the change rate is positive, the region being located where the damping force command value increases with the change rate of the load or the value corresponding to the change rate.

10. The steering damper control apparatus according to claim 3, wherein at least one type of the steering angle control information includes a region where the damping force command value increases with an absolute value of the steering angular speed.

11. The steering damper control apparatus according to claim 1, further comprising:
a command value designator configured to receive at least one of a command to designate the first command value and a command to designate the second command value; wherein
the damping force adjuster is configured, when the command is inputted to the command value designator, to select one of the first command value and the second command value, whichever is designated by the command value designator, regardless of a magnitude relation between the first command value and the second command value.

12. The steering damper control apparatus according to claim 1, wherein the damper includes:
a magnetic fluid; and
an electromagnet configured to apply a magnetic field to the magnetic fluid in response to an electric current flowing therethrough which corresponds to one of the first command value and the second command value selected by the damping force adjuster.

13. The steering damper control apparatus according to claim 12, wherein:
the damper is configured to generate the damping force by a shearing force of the magnetic fluid; and
the electromagnet is configured to vary the shearing force of the magnetic fluid.

14. The steering damper control apparatus according to claim 1, wherein:
the load information detector is a pressure detector configured to detect a pressure of a front wheel suspension; and
the damping force adjuster is configured to determine the first command value according to a change rate of the pressure of the suspension.

15. A saddle riding type vehicle comprising a steering damper control apparatus, the steering damper control apparatus including:
a damper configured to generate a damping force which acts on a steering device;
a load information detector configured to detect information relating to a load received by a front wheel;
a steering angle detector configured to detect a steering angle of the steering device; and
a damping force adjuster configured to control the damper with one of a first command value which is a damping force command value according to a change rate of the load or a value corresponding to the change rate, and a second command value which is a damping force command value according to a steering angular speed, based on each detection result of the load information detector and the steering angle detector.

\* \* \* \* \*